Feb. 19, 1957 K. A. KNUTSEN 2,781,971
ARRANGEMENT FOR CHECKING THE TRANSCRIPTION
OF NUMERALS ON DOCUMENTS
Filed June 16, 1951 4 Sheets-Sheet 1
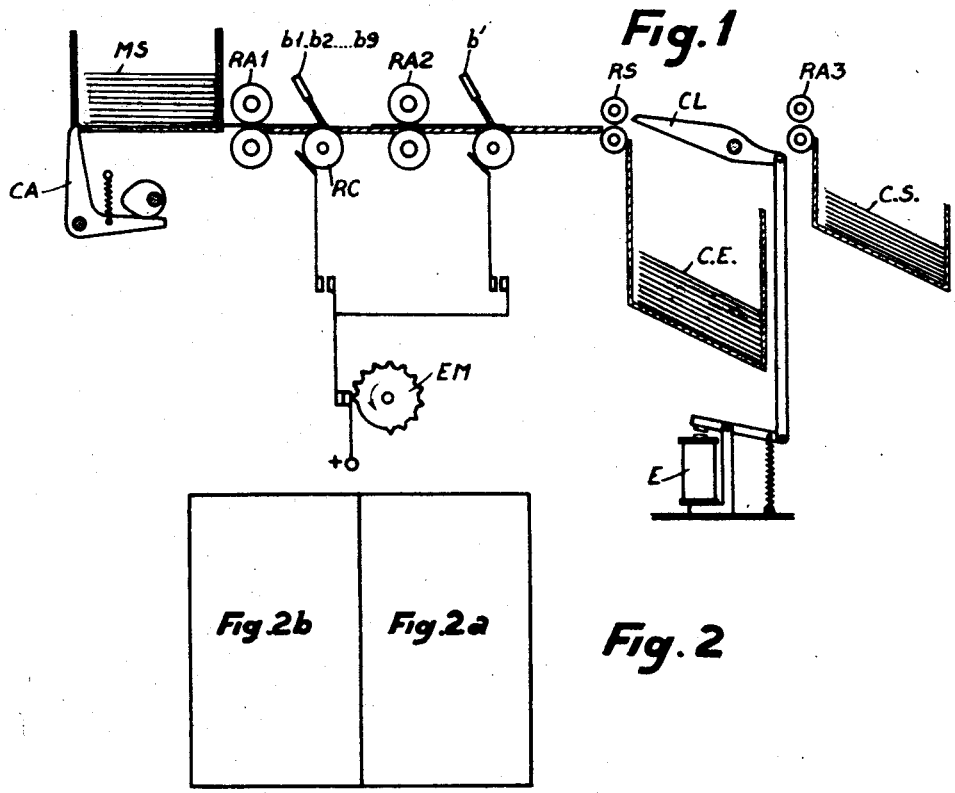
Fig. 1
Fig. 2
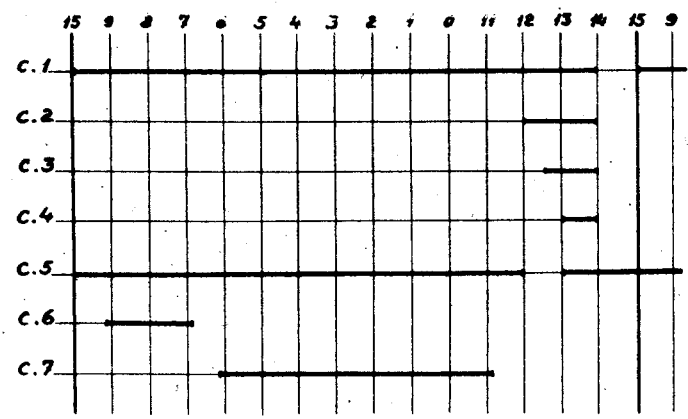
Fig. 3
INVENTOR
KNUT ANDREAS KNUTSEN
BY:
AGENTS Feb. 19, 1957 K. A. KNUTSEN 2,781,971
ARRANGEMENT FOR CHECKING THE TRANSCRIPTION
OF NUMERALS ON DOCUMENTS
Filed June 16, 1951 4 Sheets-Sheet 4

INVENTOR
KNUT ANDREAS KNUTSEN
BY: Haseltine, Lake & Co, AGENTS

United States Patent Office 2,781,971
Patented Feb. 19, 1957

2,781,971

ARRANGEMENT FOR CHECKING THE TRANSCRIPTION OF NUMERALS ON DOCUMENTS

Knut Andreas Knutsen, Paris, France, assignor to Compagnie des Machines Bull (Societe Anonyme), Paris, France Application June 16, 1951, Serial No. 231,958

Claims priority, application France June 17, 1950

7 Claims. (Cl. 235—61.7)

The present invention relates to a method and a device for transcribing a series of digits to a record card for accounting machines while controlling the accuracy of the transcription. The invention is related to the principles already disclosed in U. S. patent applications No. 190,507 of October 17, 1950, now Patent No. 2,759,669; No. 207,555 of January 24, 1951; and No. 216,887 of March 22, 1951, now Patent No. 2,755,022, to which reference might be of interest. The present invention is however distinguished by certain essential features which will hereinafter be defined.

The object of the invention is the avoidance of errors which may occur during the transcription of numerical data to a record card for accounting machines or other similar documents, such data being for example the number of an individual bank account or similar registration number. These numbers are composed of a series of digits, e. g. 342, 847, 651. For this purpose, a character other than an arithmetical numeral, preferably a letter, is added to this series of digits as a check symbol, thus avoiding any possible confusion with the digits of the registration number. The complete registration number thus formed, will be for example 342, 847, 651 E. The coinciding of the symbol which is arrived at by simple operations effected on the digits, which operations are preferably effected automatically by appropriate means, with the symbol scanned on the card or document, guarantees the accuracy of the transcription with sufficient accuracy for practical requirements.

The primary object of the invention is a process whereby an accurate transcription of the registration number is assured by the existence of a check character which is always of a nature differing from that of the digits, preferably in the form of a letter, this character being determined from the digits of the registration number recorded on the record card in the usual manner.

The said check character is arrived at in accordance with the invention by the following method:

A first check digit is calculated using notation base 3 and a second check digit is calculated at the same time, using base 8. The combination of the two check digits produces the desired check letter-symbol.

In order to calculate the second check digit, each recorded digit is converted into a combination indicating the presence or absence of a parameter on three identical channels (for example by the presence or absence of a potential combination along three different conductors), the said combination representing the registration number in a preestablished code. For calculation of the first check digit, a single channel of the same type is employed.

The functions of the four channels are permuted from one reference digit to the next (in the preferred embodiment of the invention, there are three distinct possible permutations).

For calculation of the second check digit, the digits converted in accordance with the pre-established code are entered into a cyclic totalization arrangement (without carry-over) of base 8, and for calculation of the first digit, they are entered into a cyclic totalization arrangement of base 3, while taking the said permutations into account.

The combination of the two check digits, preferably in accordance with the Bull code, produces the check letter.

The invention has for its further object a process for the formation of a symbol by the combination of two symbol digits which are simultaneously obtained from the digits which make up the registration number, by operations using two series of conventional digits, each of which corresponds to a digit of the reference number, certain being expressed and exploited for the formation of the first symbol digit in accordance with the binary system, and the others for the formation of the second symbol digit being expressed in accordance with the binary system and exploited in accordance with the ternary system.

The invention also includes a symbol forming method wherein the digits of the registration number are converted into conventional digits in accordance with a preestablished code, which code varies from one column to the next.

Another object of the invention is to provide such a method, wherein the code variation is obtained by permutation of the three channels in which the values representative of the conventional digits appear.

Security against the possibility of errors resulting from interversion between two successive columns, against errors resulting from interversion between two non-successive columns (to a lesser degree) and against the possibility of errors which may be called over-valuation between two columns in which the two digits have both been increased by the same amount by the transcriber (it is surprising to note that this error is relatively frequent) is sought, by changing the code according to the columns.

Naturally, not all codes are suitable for achieving this end, but by successive tests it is possible to obtain codes having a minimum number of systematic failings and which for practical requirements are satisfactory.

When considering an accounting machine record card, comprising an alphabetical code, of the "Bull" type, for example, it is seen that in starting from the bottom, there are three positions marked in column 9, 8, 7, and seven other positions 6, 5, 4, 3, 2, 1, 0 to which 11 (not indicated on the card) may be added.

It is known that in order to determine a letter of the alphabet according to usual methods, one of the digits of the first group (9, 8 or 7) and one of the 8 digits of the second group are employed. When wishing to determine a check symbol letter, two digits must therefore be determined, one in a ternary system, and the other in a system of base 8.

The first step in determining these two check digits is to establish a conventional correspondence in accordance with the invention, this correspondence being more or less chosen at random, according to application convenience, and being so conceived that a group of two conventional digits, one of which is included between 0 and 1 and the other between 0 and 7, corresponds to each digit included between 0 and 9.

For example:

For 1:0–2
        For 2:0–4
        For 3:0–6
        For 4:1–0 etc.

This correspondence applies to the first column of the registration number. Other correspondences are then formed for the following columns. Here an effort is made to arrive at the correspondence best suited for immediate detection of the most frequent errors (interversion, over-evaluation, or errors in individual figures) by means of the treatment to which the conventional digits are subjected. For example, the following conventional table could be adopted:

|   | I | II | III |
|---|---|---|---|
| 1 | 0-1 | 0-2 | 0-4 |
| 2 | 0-2 | 0-4 | 1-0 |
| 3 | 0-3 | 0-6 | 1-4 |
| 4 | 0-4 | 1-0 | 0-1 |
| 5 | 0-5 | 1-2 | 0-5 |
| 6 | 0-6 | 1-4 | 1-1 |
| 7 | 0-7 | 1-6 | 1-5 |
| 8 | 1-0 | 0-1 | 0-2 |
| 9 | 1-1 | 0-3 | 0-6 |
| 0 | 1-4 | 1-1 | 0-3 |

I, II and III represent the first three columns. Column IV would have the same code as column I, and similarly, V and II, VI and III, etc., etc.

The first digit of the two digit group, which is either a 1 or a 0, is added in base 3 without carry-over, thereby producing a 0, a 1, or a 2, and the second in base 8, without carry-over (or $2 \times 2 \times 2$), which produces a figure between 0 and 7. The two check digits thus formed finally permit of obtaining the alphabetical checking letter by the following code:

| A | 0-0 | J | 1-0 | S | 2-0 |
|---|---|---|---|---|---|
| B | 0-1 | K | 1-1 | T | 2-1 |
| C | 0-2 | L | 1-2 | U | 2-2 |
| D | 0-3 | M | 1-3 | V | 2-3 |
| E | 0-4 | N | 1-4 | W | 2-4 |
| F | 0-5 | P | 1-5 | X | 2-5 |
| G | 0-6 | Q | 1-6 | Y | 2-6 |
| H | 0-7 | R | 1-7 | Z | 2-7 |

(It goes without saying that the invention is transposable, and may be adapted to other similar alphabetical codes.)

Actually, the code permutation is chosen so as to be as simple as possible in practice, while at the same time affording sufficient security against errors. As has already been stated, a first channel is employed, along which a potential is or is not present, acording to whether the first conventional digit is a 1 or a 0, then a group of three similar channels, corresponding to the binary decomposition of the second conventional digit. It is then sufficient, in accordance with the invention, to effect permutations on these four channels in order to obtain code permutations. The conventional table given above is thus translated in the following manner (in each column I, II, or III, the four channels 1, 2, 3 4, are seen successively, an "$x$" indicating the existence of a potential along the corresponding channel):

| Permutations | I | | | | II | | | | III | | | |
|---|---|---|---|---|---|---|---|---|---|---|---|---|
| Chains | a | b | c | d | b | c | d | a | c | d | a | b |
|  | 1 | 2 | 3 | 4 | 1 | 2 | 3 | 4 | 1 | 2 | 3 | 4 |
| Digits 1 |   |   |   | $x$=0-1 |   |   | $x$ |   =0-2 |   | $x$ |   |   =0-4 |
| 2 |   | $x$ |   =0-2 |   | $x$ |   |   =0-4 | $x$ |   |   |   =1-0 |
| 3 |   | $x$ | $x$=0-3 |   | $x$ | $x$ |   =0-6 | $x$ | $x$ |   |   =1-4 |
| 4 | $x$ |   |   =0-4 | $x$ |   |   |   =1-0 |   |   |   | $x$=0-1 |
| 5 | $x$ |   | $x$=0-5 | $x$ |   | $x$ |   =1-2 |   | $x$ |   | $x$=0-5 |
| 6 | $x$ | $x$ |   =0-6 | $x$ | $x$ |   |   =1-4 | $x$ |   |   | $x$=1-1 |
| 7 | $x$ | $x$ | $x$=0-7 | $x$ | $x$ | $x$ |   =1-6 | $x$ | $x$ |   | $x$=1-5 |
| 8 | $x$ |   |   =1-0 |   |   |   | $x$=0-1 |   |   | $x$ |   =0-2 |
| 9 | $x$ |   | $x$=1-1 |   |   | $x$ | $x$=0-3 | $x$ | $x$ | $x$ |   =0-6 |
| 0 | $x$ | $x$ |   =1-4 | $x$ |   |   | $x$=1-1 |   |   | $x$ | $x$=0-3 |

(The numbers of the channels correspond to the numbers of the chains indicated in the diagram of the device, which will later be described, in which they are designated by Ch. 1, Ch. 2 etc.) It is seen that if the potential states along the four channels are represented by $abcd$ in the case of column I, they are represented by $bcda$ in column II, and $cdab$ in column III, from whence the codes employed are deduced. It is evident that the codes employed are in no way limitative and that others could similarly be used without departing from the scope of the invention.

Assuming for example that the check letter to be added to the registration number 342, 847, 651 is desired. The conventional digits are 011  111  010
300  005  624

First symbol digit: $1+1+1+1+1+1=6-2\times3=0$
Second symbol digit: $3+5+6+2+4=20-2\times8=4$ The corresponding letter-symbol is E.

The invention also concerns a first form of realization of the checking device, according to the aforementioned method, wherein the number to be controlled, which is scanned in a first cycle, on the record card, by the brushes of the scanning device, is exploited during this same cycle by the said device, which automatically calculates the two symbol digits which during a second cycle are compared with the two digits of the symbol scanned in a special column of the record card.

The invention further concerns a second form of realization of the checking device, according to the process described above, which in a single cycle, and by means of the same scanning device effects the scanning of the number to be controlled, calculation of its check symbol, comparison of this symbol with the check symbol scanned on the card during the same cycle and with the same scanning device, and the eventual recording on the card, of the said calculated symbol.

For a greater understanding of the invention, reference may be made to the descriptions of the check devices which are given, in conjunction with the following figures:

Fig. 1 shows diagrammatically, in section, an arrangement of the principal organs of a tabulating machine for the scanning of cards;

Fig. 3 shows a graph of the closing times of the cam contacts of Figures 2a and 2b, taken together;

When referring to Fig. 1, it is seen that the cards to be dealt with are contained in an upper magazine MS, from whence they are extracted one by one by a feed blade CA, which operates with a reciprocating motion. By its motion, blade CA engages a card between feed rollers $RA_1$, which push the card under the first scanning arrangement which is comprised of brushes $b_1$ to $b_9$, assuming in a nonlimitative manner, that the registration number is comprised of nine digits. The said brushes are connected to the checking device, but are also connected to the totalisation, calculation, and printing devices of the machine. Rollers $RA_2$ then push the card under the second brush $b'$, which scans the symbol recorded on the card by means of a brush connected to the checking device, which compares the said recorded symbol with the symbol calculated by the said checking device from the digits of the number to be checked.

The card is then taken up again by delivery rollers RS, and falls into compartment CE, if the two symbols are identical. If this is not the case, that is to say, if an error is detected by the checking device, a voltage is received at a utilization terminal U (Fig. 2b and Fig. 2c). This voltage may be used for stopping the machine, or for actuating any other means for signalling the error, or for segregating the card. To this end, the current obtained at the aforementioned utilization terminal energizes electromagnet E, the armature of which, through mechanical transmission means, actuates flap CL, which directs the card towards segregating-ejecting rollers RA₃, from whence it is directed towards the compartment for segregated cards CS.

Figure 2A:
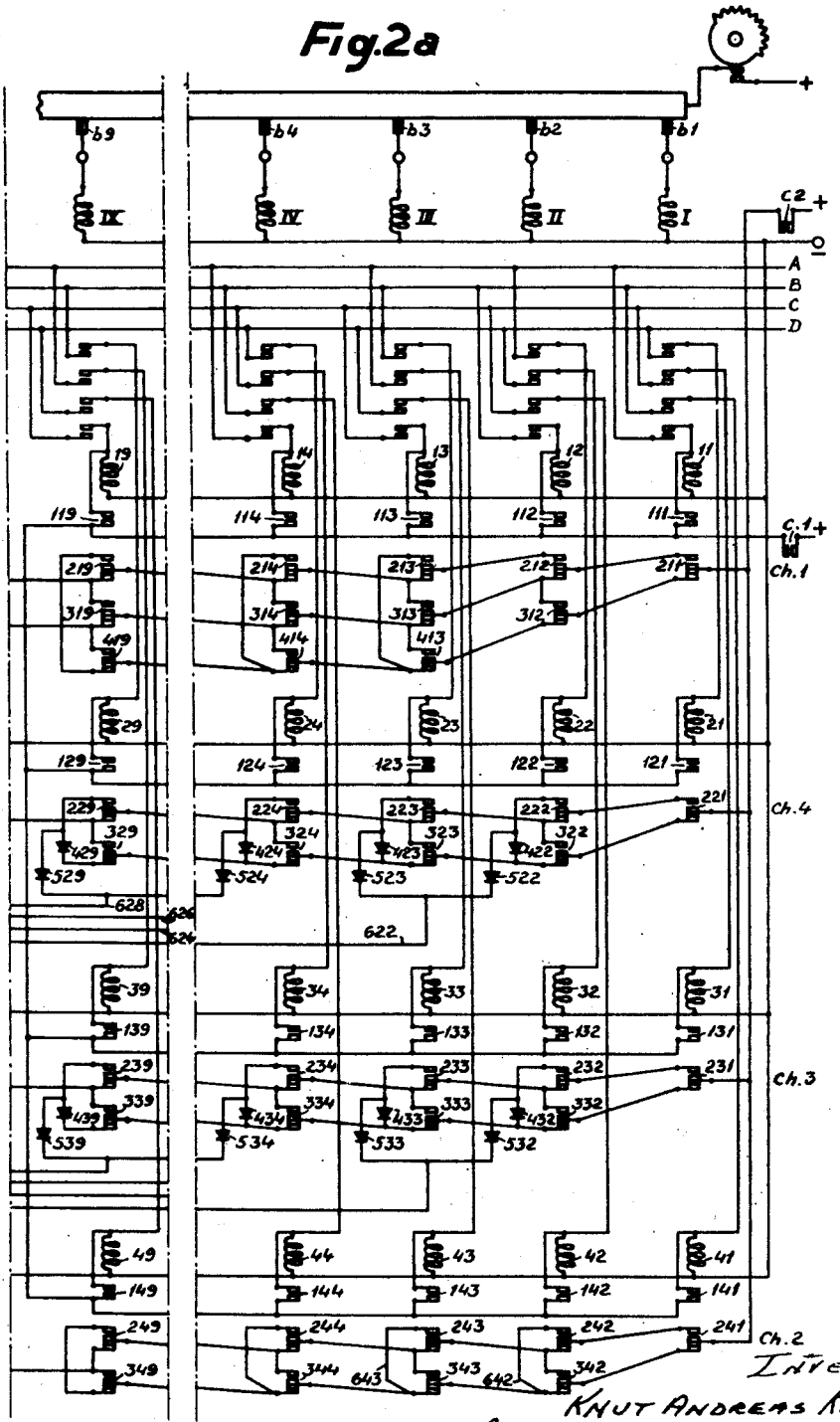
Fig. 2 is made up of two parts 2a and 2b which supplement one another and represents a device according to a first realization offered by way of non-limitative example, with which the process in accordance with the invention is carried out.
Fig. 2c shows part of a diagram which exactly reproduces the upper portion of aforementioned Fig. 2b, which is bounded by the dot-dash lines A—A'—A", so as to constitute, when taken with the remainder of Figure 2b, and Fig. 2a of the first realization, the entire diagram of the second realization herein mentioned, of the checking device, according to the invention.
Figure 2B:
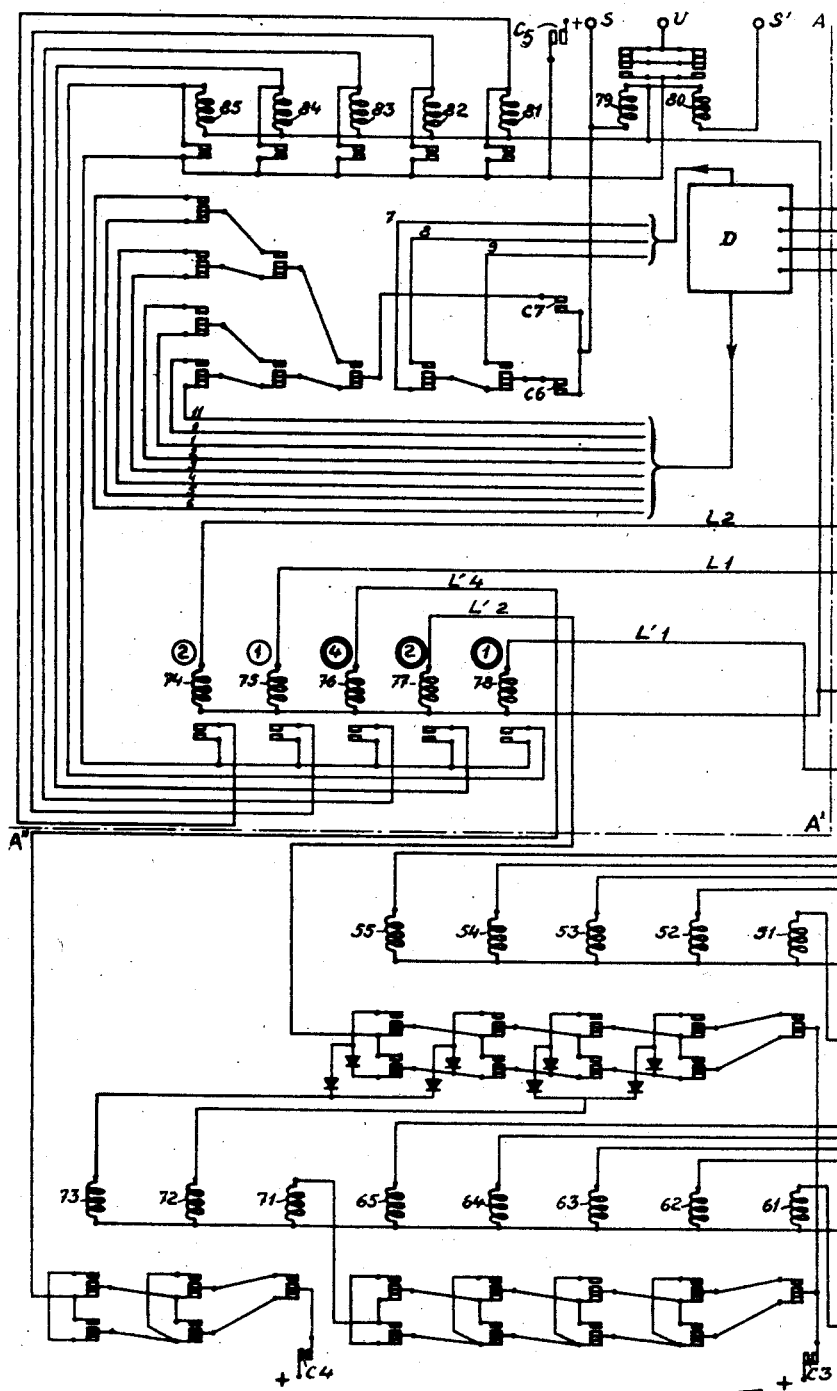
Figure 2C:
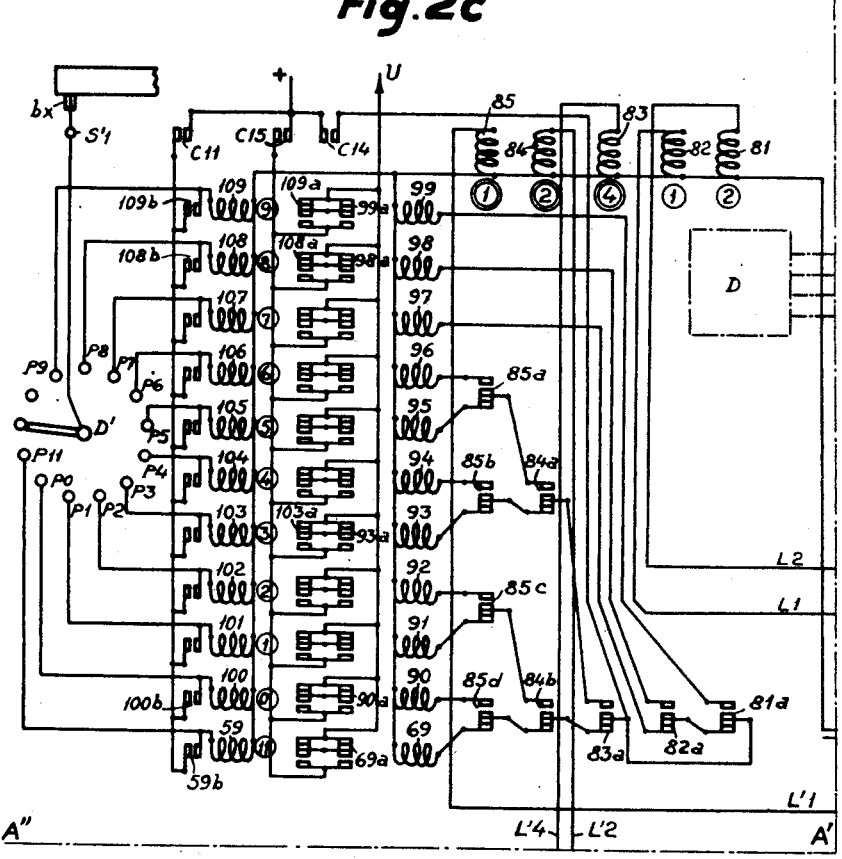

A high speed for the symbol formation has been desired for the device shown in Figs. 2a–2b which is assumed to be adapted to a perforated card accounting machine. For obtaining this rapidity, the card is explored simultaneously by the nine brushes $b_1$ to $b_9$ mentioned above, and therefore, 9 electro-magnets I to IX are energized in accordance with the perforations scanned, some of them being simultaneously energized. Naturally, someone specialized in these questions could easily realize another device, based on the one which will be described, but comprising fewer relays, with a column-by-column exploration of the card. This other arrangement which for practical requirements may be regarded as less interesting, would also be included in the scope of the invention.

In consulting the diagram of the figure, it will be observed that all contacts associated with a relay are situated below this same relay, and the mobile contacts are always drawn upwards. Furthermore, although only five relays have been shown, namely I, II, III, IV and IX, 9 relays appear in the non-restrictive example previously referred to, and all elements which are not shown in the space included between relays IV and IX can be easily deduced by extrapolation of what is actually shown.

A distributor D, which either comprises only cams or which is formed by a rotating distributor which feeds the relays of which the contacts are combined accordingly, supplies voltages along four lines A, B, C, D, at the required times, these voltages being indicated by crosses in the table of permutations, in the sub-columns a, b, c, d, respectively. Thus, in the horizontal line of the card, explored at the time corresponding to point 6, lines B and C will be fed; at point 5, lines B and D etc. Relays I to IX are eventually energized by the perforations scanned by brushes $b_1$ to $b_9$, and at the instant when the perforation is explored, close their contacts. Consequently, relays 11 to 49 are selectively fed, but for each column of the card with respect to the adjacent column, a permutation exists in their connections to lines A, B, C, D (permutation abcd—bcda—cdab of the table of permutations), so that only the required relays are fed each time for each column in question. It is first to be noted that of these relays, relays 11 to 19 correspond to the single channel (for example sub-column a of column I of the permutation table) in which the conventional digits are expressed in the binary system, and exploited in the ternary system, while the other three series 21 to 29, 31 to 39 and 41 to 49 correspond to exploitation in base 8, the first of these three series 21 to 29 being for the units order ($2^0$) for example sub-column d of column I of the table of permutations, the second series 31 to 39 for the $2^1$, for example sub-column c of column I of the table of permutations, and the third series 41 to 49 being for the $2^2$, for example, sub-column b of column I of the permutation table.

All the relays control several series of contacts. Relays 111 to 119, 121 to 129, 131 to 139, and 141 to 149 are simple holding contacts, made up of two blades, which keep the corresponding relays energized, until point 14 (see Fig. 3, which shows a graph for the opening times of the cam contacts) of the cycle, at which instant a contact C1 goes into operation, and breaks these holdings, in order to be able to deal with the following card. The other contacts which are make-and-break contacts having three blades, viz. one mobile blade between two stationary blades, introduce the conventional digit into either of the totalization chains fed by C2, from point 12 to point 14. Thus, if for example a 6 is scanned in column II, lines B and C are provided with voltage, as is known, and consequently, relay II closes its contacts, and relays 12 and 42 are energized, and hold their contacts 112 and 142. Considering first what happens in the chain of contacts (Ch. 2) which corresponds to relays 41 to 49 and which must correspond to the introduction of the 4's into the cyclic totalization system, which as a final result, produces the second digit symbol, it will be seen that there are actually two contact chains; one passing through 241, 242, 243 . . . 249, and representing the digit 4, and the other passing through 241, 342, 343 . . . 349, and representing the digit 0. The energization of 42, since the first chain is being fed, and no other relay 41 to 49 is yet energized, causes the voltage supply to pass from the lower to the upper chain, that is to say, it introduces a 4. It is seen that with the existing connections, such as 642, 643 etc., the energization of a second relay brings the voltage supply back to the lower chain. 4+4=8, equivalent to zero, has been obtained for the operation in question. Finally, at the extreme left hand side of the chain, there is a connection which provides relay 61 with voltage if the number 4 has been introduced an odd number of times for all the columns.

A similar process takes place for the ternary chain (Ch. 1) which is made up of the contacts of relays 11 to 19; now, however, a chain of zeros is found, which is made up of 211, 312, 413, 414, 415, . . . 419; a chain of 1's made up by 211, 212, 313, 314, 315, . . . 319, and feeding relay 75; and a chain of 2's, which is made up of 211, 212, 213, 214, 215 . . . 219 and feeding relay 74. The energization of one of the relays 11 to 19 changes the voltage supply from the chain of 0's to the chain of 1's; of a second relay, changes the voltage supply from the chain of 1's to the chain of 2's; and of a third relay, brings the voltage supply back to the chain of 0's, and so on. Only a 1, a 2, or nothing, may therefore be delivered at the left hand extremity of the chain.

It will now be assumed that an 8 is scanned in column II. This results in a voltage along line A, and the energization of relay 22, which therefore closes its holding contact 122 and remains energized for the duration of the cycle. Again there are two chains of contacts, of which one 221, 322, 323, 324, 325, . . . 329 represents the chain of 0's, while the other 221, 222, 223, 224, . . . 229 is the chain of 1's. It will be seen that the change-over of contact 322 results in a change in feeding from the lower chain to the upper chain. If by the energization of 21 and the changeover of 221, a 1 has already been introduced, there would have been a return of feeding to the chain of 0's as in the preceding cases, however, this time, a carry-over is produced, that is to say, a voltage exists along line 622, through the intermediary of blocking cells, such as 422, 522 thus permitting the passage of the current only in the required directions. It should be borne in mind that the cyclic totalization takes place in base 8, in other words, for the totalization chains of the orders 1 and 2, it is necessary to provide carry-overs to the next highest order, 2 and 4 respectively. It is possible to combine two consecutive relay carry-overs, one of which emanates from the passage of the line of 0's to the line of 1's, and the other in the opposite manner, along a common line 622 or 624, etc., since they cannot occur simultaneously. Thus, the different relays 52, 53, 54 and 55 may be energized each time there is a carry-over of value 2. Similar explanations may be given for explaining the operation of the chains (Ch. 3) controlled by relays 31 to 39, with the difference that the units order 2 is used, that is to say, 2's are added thereto and a 2 can be delivered at the extreme left hand side of the chain, the carry-overs being 4's and acting upon relays 62 to 65.

It is now merely necessary to add the carry-overs together, and with the digits obtained from the extreme left hand side of the three chains of the different binary orders, while taking care to add only carry-overs and digits of equal value. This is done by similar methods, but with two slight delays, provided by the presence of cam contacts C3 (closed from point 12½ to point 14) and C4 (closed from point 13 to point 14).

In a first operation, the 4 which is eventually provided by the primary chain of 4's, applied to relay 61, and the 4's which eventually emanate from the carry-overs of the primary chain of 2's, applied to relays 62 to 65 are added together in a secondary chain, from whence a 4 applied to relay 71 may issue. The 2 which may emanate from the primary chain of 2's, applied to relay 51, and the 2's which may emanate from the carry-overs of the primary chain of 1's, applied to relays 52 to 55, are simultaneously added in a secondary chain, from whence may be delivered a voltage, representative of 2, applied to relay 77. The carry-overs of 4 which may emanate from this secondary chain of 2's, are applied to relays 72 and 73, and may be added to the 4 of relay 71. Finally, a 4 may be delivered by the tertiary chain of contacts controlled by these three latter relays, the said 4 being applied to relay 76.

The two digit symbols are thus obtained, the first, directly, in the form of a possible voltage, along one of the lines L1, L2, and the second, as a binary representation, in the form of voltages along lines L'1, L'2, L'4. Due to the actuation by relays 81 to 85 of the make-and-break contacts forming appropriate combinations, it is not difficult to obtain lines, each of which corresponds to 9, 8, 7, and to 6, 5, 4, 3, 2, 1, 0, 11 respectively. These lines are fed during the greater part of the cycle, following the scanning cycle, owing to the presence of cam contact C5. At line S, two impulses coming from the distributor by way of different lines are received, in equal number to the scanning points which are separated into two groups (one corresponding to 9, 8, 7 and the other to 6, 5, 4, 3, 2, 1, 0, 11), under control of C6 and C7 respectively. These two impulses correspond to a certain letter which may be shown by any usual means. The letter obtained may also be compared to the symbol letter of the card, by a comparison effected by using two relays 79 and 80 of the impulses corresponding to the digits of which they make up the combination arriving at S', due to the second scanning of the card, one cycle after the first scanning. If a difference is detected, a voltage obtained at U stops the machine, operates an indicator, etc. Although a device has been described wherein the code variation is repeated every three columns, other systems of variation could equally be adopted without departing from the scope of the invention, as could any operational functions which are based on the method according to the invention. Attention is called to the fact that the method based on exploitation using the bases 3 and 8, merely constitutes a convenient form of application to the Bull alphabetical code and that it does not insure complete security against error. Other methods could also be adopted without leaving the confines of the invention, under condition that the principle be retained of converting each digit of the registration number into several conventional digits, upon which simultaneous exploitations are effected, using bases of low value (2 or 3 for example) with variation of the conventional code according to the column, so as to obtain one or several conventional control signs. The number of channels could be more than 4, the number of separate coding permutations could be more than 3, the bases for the cyclic totalization could be for example 6 and 16 instead of 3 and 8 etc.

It will be noted that this device, as described by way of non-restrictive example, is of interest because it may be applied to the control of mixed data composed of both letters and digits, the letters entering the apparatus preferably in accordance with the two digit code referred to in the foregoing for expressing the check letter for columns III, IV and IX, and undergoing the permutations already described in the other columns.

However, for various usages of the machine, it might be desired that the control be executed in using a single analyzing device, that is, in a single cycle. This may also be the case, for example, in perforated card reproducing machines, for which there is usually only one scanning-control arrangement available after punching. A reproducing machine of this type has been described in U. S. Patent application No. 53,503 of October 8, 1948, now Patent No. 2,623,592. It is obvious that the checking device when adapted to such machines, is able to determine the check symbol which corresponds to the registration or number in question, and is able to check the recording of the said symbol in the punching device of the said machines.

In order to meet these conditions, a second form of the control device in accordance with the method hereinbefore described (Figs. 2a–2c) will now be described, Fig. 2c corresponding exactly to the upper part of Fig. 2b, which is surrounded by a dot-dash line A—A'—A'', the different lines L1, L2, L'1, L'2, fit over each other exactly, as does the general line, while the impulse distributor D of the accounting machine previously mentioned, remains in the same place.

Finally, it is recalled that lines L1, L2, L'1, L'2 and L'4 are fed in exactly the same manner as described in the first form of the checking device, that is to say, the current is fed thereto through the intermediary of the chains of make-and-break contacts previously mentioned, from various cam contacts C2, C3, C4.

Relays 74 to 78 of Figure 2b are here identical to relays 81 to 85 which are directly excited by the aforesaid lines, the corresponding values 1 and 2 shown in the ternary system, or 1, 2, 4 in the binary system with calculation base 8, being shown below, in single and double circles respectively. As in the first form of realization, the said relays control make-and-break contacts, which bear the number of the energizing winding which bears an alphabetical index. In the second form shown in Fig. 2c, the aforementioned chains which are formed, lead to relays 69 and 90 to 99, each of which controls a make-and-break contact bearing the same number and index *a*.

Terminal S'1 is connected to scanning brush *bx*, which corresponds to the recording column on the card of the check symbol to be verified. This brush makes up a part of the scanning arrangement with which other brushes are used at the same time, for the scanning of the registration or number to be controlled, for example the brushes numbered $b_1$ to $b_9$ (Fig. 2a). Terminal S'1 is connected, as is seen in this figure, to the arm of distributor D', which is connected with a relay magazine (59 and 100 to 109). The said arm passes over contacts $p_9$ to $p_0$ and $p_{11}$ at the same time as the perforations of the card reserved for the symbol pass under scanning brush *bx* so that for each perforation scanned, a corresponding relay, 59 or 100 to 109 connected to the contact momentarily under voltage is energized i. e. 109 for perforation 9, 108 for perforation 8, and so on. Each relay energized closes a holding contact marked with the index *b*, shown on the left of the relay which is fed by cam contact C11. Each relay also controls a make-and-break contact marked with the index *a*, and shown to the right of it in the rest position in the diagram. Each of these make-and-break contacts is connected to one of the identical make-and-break contacts 69*a* and 90*a* to 99*a*, controlled by relays 69 and 90 to 99, so that each group of make-and-break contacts is actuated by a group of 2 relays (one taken from the group of relays 59, 100 to 109, and the other from the group 69, 90 to 99) which are energized for the same decimal value to be represented. There are thus eleven comparison groups, each formed by two relays 99 and 109, 98 and 108 etc., controlling their make-and-break contacts of index *a*. Each of these groups corresponds to a value 11 or 0, or 1 etc., up to 9, these digits being surrounded by a circle next to each group.

In these groups, the left-hand relays (59 and 100 to 109) are energized according to the recording positions of the symbol of the card, and the right-hand relays (69 and 90 to 99) according to the values of the check symbol determined by the checking calculating device, provided that cam C14 is closed.

These values are arrived at in the following manner: if neither of the lines L1 and L2 is energized, that is, if the digit is a 0, the contacts actuated by relays 82 and 81 are in the position shown in Fig. 2c. The + voltage is consequently transmitted to relay 97 at the instant when C14 is closed. Consequently, the preceding value 0 corresponds to a 7. If L1 is energized, relay 82 closes 82a in an upward movement, and at the closing of C14, relay 98 is energized. Consequently, the decimal value 8 corresponds to the ternary value 1. A similar reasoning shows that the decimal value 9 corresponds to the ternary value 2. With regard to the second digit symbol, arrived at through the presence or absence of voltage along L'1, L'2, L'4, it is obtained in the following manner: if no voltage is present along these 3 lines, relays 83 to 85 remain inoperative, and their contacts 83 to 85d are in the position represented in Fig. 2c, while relay 69 is energized at the instant C14 closes. This time, a zero for the second digit symbol corresponds to the decimal value 11. If L'1 is energized, 85 is also energized and closes 85a, 85b, 85c, and 85d, in an upward movement, energizing relay 90 at the closing of C14, by means of contacts C14, 83a, 84b, 85d. The decimal value 0 corresponds to the value 1 of the second digit symbol. In like manner, it will be readily seen that the decimal values 1, 2, 3, 4, 5 and 6, correspond to the values 2, 3, 4, 5, 6, and 7 of the second digit symbol respectively.

Figure 4:
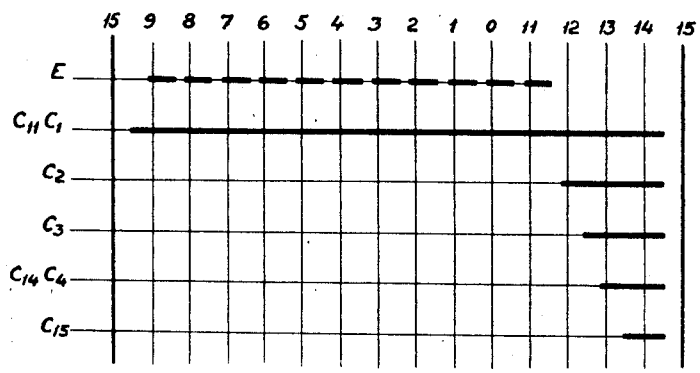
Fig. 4 shows a graph of the closing times of the cam contacts of Figures 2a and 2c, taken together.

In order that the operation of the device may be well understood, reference must also be made to the graph shown in Fig. 4, which indicates the closing times of the cam contacts in a cycle made up of 15 points per card. Line E supplies the current impulses sent by emitter EM (Fig. 1) to contact roller RC of the scanning arrangement, which impulses may be called exploration impulses.

C1, C2, C3, C4 are the cam contacts which appear only in Figures 2a and 2b, and for which it is sufficient to know that they control respectively, in the second form of the checking device: for C1, the holding of the calculation relays which actuate the chains of contacts already mentioned; for C2, the impulse passing through the said chains; for C3 and C4, internal carry-overs.

If the closing times of these contacts are compared with those indicated in Fig. 3, it will be seen that they are slightly increased, this being for reasons of reliability of operation.

The closing time of cam contact C11 is the same as that of C1, and the same is true for C14 and C4, therefore making possible the replacement of each of the two groups C11 and C1, and also C14 and C4 by a single contact.

It will be assumed for example that the letter N, which in a usual code is expressed by the combination of the digits 8 and 3, is supplied at the same time by the right hand side and the left hand side of the assembly of comparison groups, that is relays 108, 98 and the relays 103a and 93 are simultaneously energized during the closing of C15, in the vicinity of point 14. The result of this is that at this instant, no current can flow through the contacts of the comparison groups, viz. 108a and 98a, and also 103 and 93a, and no voltage will be received at U.

On the other hand, it will be assumed for example that the letter N (perforations 8 and 3) is scanned on the card as a symbol and that the letter P (perforations 8 and 4) is supplied by the calculating device of the invention. In this case, 108 and 98 are simultaneously energized, 108a and 98a are attracted, and the group of comparison contacts corresponding to the 8 does not allow anything to pass. However, 93 attracts 93a, while 103a remains inert. A circuit +C15, 93a, 103a, U may be established. In like manner, 104 attracts 104a, by which a similar circuit may be made. The principle of this comparison device is known, and may be replaced by any other equivalent arrangement.

In reproducing machines having only one scanning-checking arrangement available after perforation, and wherein the checking is effected by comparing the punched card with the elements which control the punching thereof, the checking device according to the second form of realization may be advantageously used for effecting the control according to the invention.

It may happen that the data to be reproduced, which is recorded on the control cards, is not provided with a check symbol. It is obvious that in this case it is not difficult to convert the checking device according to the second embodiment, into an arrangement connected with a reproducing machine and used for recording a symbol automatically formed and recorded in a special column of the card during the reproduction of the data which will be checked by this symbol during the subsequent handling of the card by the accounting machines. In this other embodiment, it is the scanning arrangement of the reproducing machine which is used for introducing the data into the device which is the subject of the invention, and relays 68 and 90 to 99 make up a part of the storage device, or they control corresponding electromagnets of the storage device for data to be reproduced, corresponding to the recording of the symbol on the card.

I claim:

1. In an accounting machine controlled by register cards, an electromagnetic device for checking the transcription of data on such cards, each datum to be checked being accompanied by a checking symbol in a special column of the card, said device comprising: means for determining two electric parameters, each of which corresponds to a conventional figure, for each item of a column of a datum read out in the machine and according to a pre-established correspondence between a numerical item and a conventional figure, means transforming the different electric parameters into combinations of electric circuits for separately calculating a characteristic figure on each of the two series of conventional figures corresponding to one datum, said symbol being excepted, whereby two resulting further electric parameters are delivered, said transforming means varying from one column of the card to the next so as to correspondingly vary said conventional figures, electromagnetic means for comparing said further electric parameters and the results of the reading of the registered, checking symbol and for signalling an error in case of a discrepancy between them.

2. In an accounting machine controlled by register cards, an electromagnetic device for checking the transcription of data on such cards, each datum to be checked being accompanied by a checking letter in a special column of the card, said device comprising: means for determining two electric parameters, each of which corresponds to a conventional figure, for each item of a column of a datum read out in the machine and according to a pre-established correspondence between a numerical item and a conventional figure, means transforming the different electric parameters into combinations of electric circuits for separately calculating a characteristic figure on each of the two series of conventional figures corresponding to one datum, said symbol being excepted, whereby two resulting further electric parameters are delivered, electromagnetic means for comparing said further electric parameters and two electric parameters resulting from the reading of the registered checking letter and for signalling an error in case of a discrepancy between them.

3. An electromagnetic device for checking the transcription of data on register cards for accounting machines, each datum to be checked being accompanied by a checking symbol in a special column of the card, said device comprising: data reading out means for reading out in one operation all the columns of one datum, a group of input relays, each of which corresponds to one column of a card and is energized upon the reading of an item in a column of the card, a distributor of voltage pulses, four electrical lines fed from said distributor in such a manner that two distinctive said lines are alive with voltage in synchronism with the scanning of an index value of the card, several banks of calculating relays, each of which being under control of one input relay and of an eventual voltage from one said line, the connections with said lines being established differently according to the column so as to correspondingly vary the conventional figures introduced into the calculating relays, several chains of contacts under control of said calculating relays for indicating a resulting characteristic figure according to which chain is alive with voltage, said chains comprising secondary combinations of like calculating relays and secondary chains for totalizing internal carry-overs, an electromagnetic registering unit for registering two of said resulting characteristic figures, a comparing unit for comparing said last two characteristic figures respectively with two figures derived from the reading of the checking symbol, means for signalling an error in case of a discrepancy evidenced in said comparison between two compared figures.

4. An electromagnetic device for checking the transcription of data on register cards for accounting machines, each datum to be checked being accompanied by a checking symbol in a special column of the card, said device comprising: means for feeding the cards, first reading out members for reading said data, checking symbol excepted, second reading out members for reading out said checking symbols that are located with respect to the first members and the feeding of the cards so as to read a symbol after the corresponding datum has been completely read out, means for determining two electric parameters, each of which corresponds to a conventional figure, for each item of a column of a datum read out in the machine and according to a pre-established correspondence between a numerical item and a conventional figure, means transforming the different electric parameters into combinations of electric circuits for separately calculating a characteristic figure on each of the two series of conventional figures corresponding to one datum, said symbol being excepted, whereby two resulting further electric parameters are delivered, electromagnetic registering means for registering said further electric parameters, electromagnetic means for comparing said registered parameters and the results of the reading of the registered checking symbol and for signalling an error in case of a discrepancy between them.

5. An electromagnetic device for checking the transcription of data on register cards for accounting machines, each datum to be checked being accompanied by a checking symbol in a special column of the card, said device comprising: means for feeding the cards, reading out means for reading one said datum and its corresponding symbol in one operation, means for determining two electric parameters, each of which corresponds to a conventional figure, for each item of a column of a datum read out in the machine and according to a pre-established correspondence between a numerical item and a conventional figure, means transforming the different electric parameters, into combinations of electric circuits for separately calculating a characteristic figure on each of the two series of conventional figures corresponding to one datum, said symbol being excepted, whereby two resulting further electric parameters are delivered, electromagnetic means for registering temporarily said further electric parameters, electromagnetic means for registering the conventional figures originating from the reading of said checking symbol and maintaining said registering till after said further electric parameters have been registered, electromagnetic means for comparing the above registered figures in correspondence and for signalling an error in case of a discrepancy between them.

6. Apparatus for checking the transcription of a datum formed by a series of digits or letters accompanied by an appropriated checking symbol, said datum and said symbol being registered in the form of marks, according to an index position code, in the columns of an accounting document, said apparatus comprising a reading device for sensing the marks of said datum and for emitting electric impulses timed according to the position of each said datum marks, a group of input relays each group corresponding to one of the columns in which the marks of the datum are registered, said input relays being connected so as to be energized by said impulses, several connections for each column, on which connections electric impulses appear in a coded manner varying with time according to the digit value of the instant and differing from one column to the next one, banks of calculating relays connected so as to be fed by said coded impulses through contacts controlled by said input relays and thereby close a number of contacts controlled by said calculating relays, a bank of work relays each connected to a chain of said calculating relay contacts some of them directly, others through the intermediary of relays and contacts controlled therefrom so that a combination of work relays energized represents the coded value of an automatically calculated symbol, a distributor of impulses successively emitted on different lines connected to contacts of the work relays for transforming a spatial representation given by the energized work relays into a time representation of impulses emitted at determined instants on a final single line, a sensing device for reading the registered symbol thereby emitting electric impulses timed under control of the sensing of the marks of said registered symbol, and error manifesting means actuated in case of a time difference between the latter impulses and those forming said time representation.

7. In an accounting machine, a device for checking a transcription of a datum registered in the form of marks in the columns of an accounting document, these marks representing, according to an index position code, a series of digits or letters accompanied by an appropriate checking symbol and these marks being registered in two distinct groups of index positions in each of the columns, said device comprising: means for deriving in the form of electric parameters, from the index values of said marks of said series sensed by said machine, one conventional figure for the marks which are positioned in one of said groups and another conventional figure from the marks positioned in the other group, both conventional figures being derived according to a pre-established code, which code varies from one of said columns to the next one; comparison means; means for transforming said electric parameters and thus said conventional figures into electric representations of two index values according to said index position code and for storing said representations in said comparison means; means to store into said comparison means the representations of the impulses resulting from the sensing of the marks of the symbol which are sensed on the accounting document by said machine; said comparison means signalling automatically at the end of the sensing of said document if there is a discrepancy between said stored representations.

References Cited in the file of this patent

UNITED STATES PATENTS 2,377,762     Daly _____ June 5, 1945